US00RE44328E

(19) United States
(12) Reissued Patent
Chen

(10) Patent Number: US RE44,328 E
(45) Date of Reissued Patent: Jul. 2, 2013

(54) PAINTBALL GUN HAVING INTERNAL PRESSURE REGULATOR

(75) Inventor: Yi-Tsong Chen, Tainan (TW)

(73) Assignee: Sunworld Industrial Co., Ltd., Tainan Hsien (TW)

(21) Appl. No.: 13/478,542

(22) Filed: May 23, 2012

Related U.S. Patent Documents

Reissue of:
(64) Patent No.: 7,861,704
Issued: Jan. 4, 2011
Appl. No.: 12/437,420
Filed: May 7, 2009

(51) Int. Cl.
*F41B 11/00* (2006.01)

(52) U.S. Cl.
USPC ..... 124/77

(58) Field of Classification Search
USPC ..... 124/71–77
See application file for complete search history.

(56) References Cited

U.S. PATENT DOCUMENTS 7,299,796 B2 * 11/2007 Kirwan ..... 124/71
7,461,646 B2 * 12/2008 Jones ..... 124/77
7,594,503 B2 * 9/2009 DeHaan et al. ..... 124/74
7,617,819 B2 * 11/2009 Jones ..... 124/74
7,634,991 B2 * 12/2009 Yeh ..... 124/72
7,640,925 B2 * 1/2010 Jones ..... 124/73
7,640,926 B2 * 1/2010 Jones ..... 124/74
2009/0101129 A1 * 4/2009 Wood et al. ..... 124/77
2009/0301458 A1 * 12/2009 Yeh ..... 124/73
2010/0051008 A1 * 3/2010 Lian ..... 124/73
2010/0108049 A1 * 5/2010 Dobbins ..... 124/77

* cited by examiner

*Primary Examiner* — Michael David
(74) *Attorney, Agent, or Firm* — Perkins Coie LLP; Joseph P. Hamilton

(57) ABSTRACT

A paintball gun having an internal pressure regulator is provided. The paintball gun includes a body, a launching tunnel, a rear lead shaft, the pressure regulator, and a back cover. A hollow barrel of the body allows the launching tunnel and the rear lead shaft to be accommodated successively therein. The pressure regulator is received in the rear lead shaft. The back cover is screwed to the body. Thereby, pressurized air coming from a gas cylinder is directly introduced to the pressure regulator so as for the paintball gun to dispense with any external air duct. Thus, the paintball gun poses no risk of duct burst and requires less assembling operation and fewer fixtures, thus reducing manufacturing costs.

20 Claims, 5 Drawing Sheets

PAINTBALL GUN HAVING INTERNAL PRESSURE REGULATOR

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to paintball guns and, more particularly, to a paintball gun incorporating therein a pressure regulator. Since the paintball gun of the present invention dispenses with the use of any external air duct, it poses no risk of duct burst and is extremely safe in operation.

2. Description of Related Art

Paintball survival games have long been a form of popular leisure activity in western society, and are now becoming more and more prevalent in Taiwan. In the games, paintball guns and paintballs are used as weapons for shooting hypothetical enemies. For facilitating percussion, a paintball gun is typically equipped with a gas cylinder filled with pressurized air as its power source to rapidly and continuously shoot out paintballs. Conventionally, a regulator is provided between the gas cylinder and an air reservoir in the paintball gun for regulating the flow of the pressurized air running from the gas cylinder into the air reservoir so as to control inlet-air pressure. Referring to FIG. 5, a traditional paintball gun comprises a barrel A including the air reservoir A1 that has a threaded open end A2 for the regulator B to be attached thereto. Besides, the gas cylinder C connected with the lower side of the barrel A has an air duct D for introducing pressurized air into the barrel. The regulator B provides a bent portion to retain one end of the air duct D by means of clamping.

Some defects of the traditional paintball gun have been recognized.

Firstly, the air duct connected between the regulator and the gas cylinder has to be manufactured and assembled very precisely in terms of dimensions or else duct burst tends to happen at joints between the air duct and the regulator as well as the gas cylinder, endangering users.

Furthermore, in order to prevent duct burst that can seriously injure users, connection and fixation parts used at the joints have to be very precise, thus incurring high manufacturing costs.

At last, since the regulator is attached to the open end of the air reservoir, both the regulator and the air duct are exposed from the barrel, which is dangerous because a plethora of parts put together tend to get loosened when inadvertently colliding with each other.

SUMMARY OF THE INVENTION

In view of the shortcomings of the traditional paintball gun, the primary objective of the present invention is to provide a paintball gun having an internal pressure regulator so as to dispense with any external air duct, and it poses no risk of duct burst, thus being safe to users.

The paintball gun having an internal pressure regulator primarily comprises: a body including a hollow barrel that has a first chamber, a first channel, a second channel, and a third channel, wherein the second channel and the third channel communicate with the first chamber, and a retaining flange is provided so as for the retaining flange to be adjacent to the third channel; a launching tunnel shaped as a hollow tube and having: one end defined as an intake end and an opposite end defined as an outlet end, and a retainer circumferentially provided inside the launching tunnel and provided with a buffer ring and a first airtight ring, wherein the launching tunnel is such received in the hollow barrel that the retainer is positioned between the second channel and the third channel of the first chamber; a rear lead shaft disposed in the first chamber of the hollow barrel, including a first end and an opposing second end, and having a piston block disposed at the first end and provided with a second airtight ring for being fittingly coupled with the intake end of the launching tunnel, and a stepped tunnel provided at the second end of the rear lead shaft and having a fourth channel and a fifth channel, wherein the fourth channel corresponds in position to and communicates with the second channel of the first chamber in the body, and the fifth channel corresponds in position to and communicates with the first channel of the first chamber in the body; the pressure regulator disposed in the stepped tunnel of the rear lead shaft to abut against a stepped surface of the stepped tunnel; and a back cover screwed to the body and centrally formed with a through hole.

The pressure regulator comprises: a propping member, tube-shaped and tapered, abutting against the stepped surface of the stepped tunnel of the rear lead shaft and having a first stepped surface located between a third airtight ring and a fourth airtight ring that are both mounted around the propping member; a sleeve having a second stepped surface facing the first stepped surface of the propping member, a second chamber formed centrally in the sleeve, a first threaded hole, and a sixth channel in communication with the second chamber and the fifth channel of the rear lead shaft; a spring member disposed between the first stepped surface of the propping member and the second stepped surface of the sleeve; and a screw member screwed into the first threaded hole of the sleeve and having a second threaded hole that receives a seal pad for closely abutting against the propping member, and a fifth airtight ring, partially embedded in the screw member.

Therein, the spring member is a disc spring.

The paintball gun of the present invention thereby achieves at least the following advantages:

1. Since there is no external air duct connected to the pressure regulator, the paintball gun requires less assembling operation and fewer connection fixtures and parts, thus facilitating reduction of manufacturing costs, as compared with the prior art;

2. Streamlining assembling operation and using less connection fixtures and parts further reduce the risk of parts coming off or getting loose; and 3. Since the pressurized air is directly introduced into the seventh channel inside the grip from the gas cylinder, the overall intake stroke is short and the efficiency of pressure refill is improved.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE PREFERRED EMBODIMENT

Figure 1:
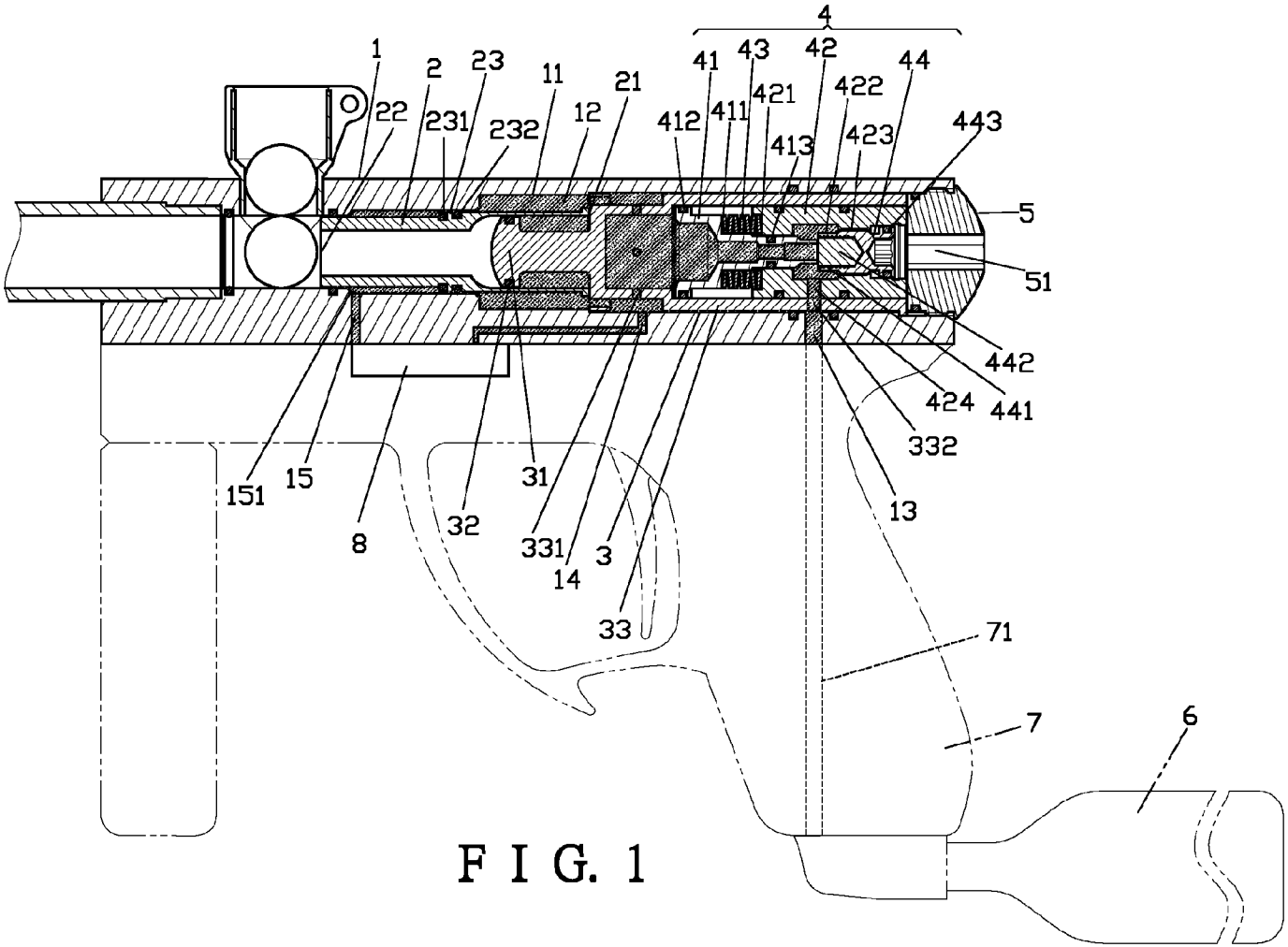
FIG. 1 is a sectional drawing of a paintball gun of the present invention.
Figure 2:
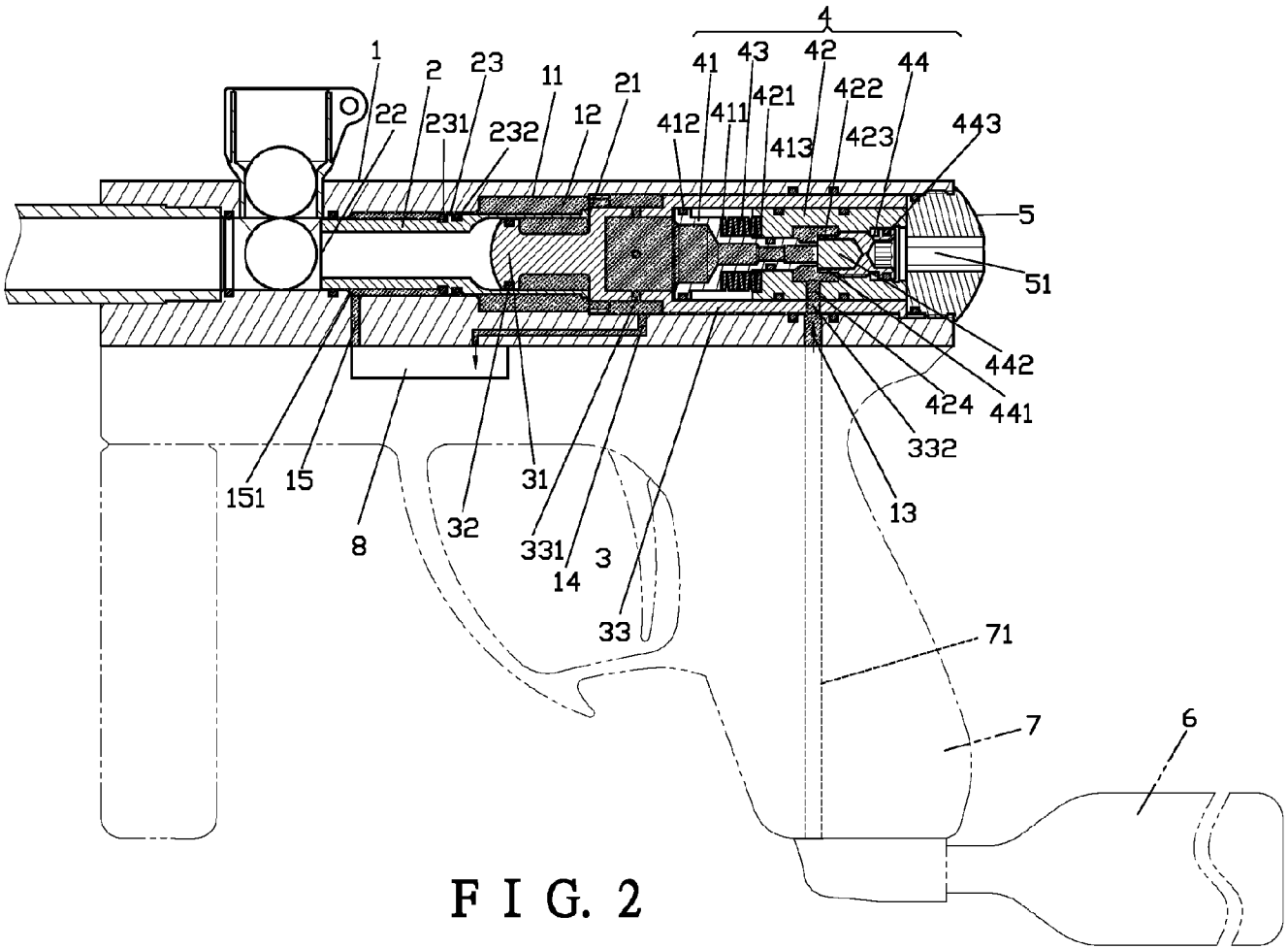
FIG. 2 shows the paintball gun supplied with pressurized air before percussion of the present invention.

Please refer to FIG. 1 and FIG. 2 for a paintball gun having an internal pressure regulator according to the present invention. As can be seen in the drawings, the paintball gun comprises a body 1, a launching tunnel 2, a rear lead shaft 3, the pressure regulator 4 and a back cover 5.

The body 1 has a hollow barrel 11 that includes a first chamber 12. The body 1 is further formed with a first channel 13, a second channel 14, and a third channel 15. Therein, the second channel 14 and the third channel 15 communicate with the first chamber 12. A retaining flange 151 is formed so as for the retaining flange 151 to be adjacent to a front end of the third channel 15.

The launching tunnel 2 is shaped as a hollow tube with one end defined as an intake end 21 and an opposite end defined as an outlet end 22. A retainer 23 is circumferentially formed inside the launching tunnel 2. The retainer 23 is provided with a buffer ring 231 and a first airtight ring 232. The launching tunnel 2 is such received in the hollow barrel 11 that the retainer 23 is positioned between the second channel 14 and the third channel 15 of the first chamber 12. In other words, the retainer 23 has a shift stroke defined between the second channel 14 and the third channel 15 of the first chamber 12.

The rear lead shaft 3 is disposed in the first chamber 12 of the hollow barrel 11 and has a first end and an opposing second end. A piston block 31 disposed at the first end is provided with a second airtight ring 32 for being fittingly coupled with the intake end 21 of the launching tunnel 2. A stepped tunnel 33 provided at the second end of the rear lead shaft 3 communicates with a fourth channel 331 and a fifth channel 332. The fourth channel 331 corresponds in position to and communicates with the second channel 14 of the first chamber 12 in the body 1. The fifth channel 332 corresponds in position to and communicates with the first channel 13 of the first chamber 12 in the body 1.

The pressure regulator 4 is disposed in the stepped tunnel 33 of the rear lead shaft 3.

The pressure regulator 4 comprises a propping member 41, a sleeve 42, a spring member 43, and a screw member 44.

The propping member 41 is a taper tube abutting against a stepped surface of the stepped tunnel 33 of the rear lead shaft 3. The propping member 41 has a first stepped surface 411 located between a third airtight ring 412 and a fourth airtight ring 413 that are both mounted around the propping member 41.

The sleeve 42 has a second stepped surface 421 facing the first stepped surface 411 of the propping member 41 and is centrally formed with a second chamber 422. The sleeve 42 is further formed with a first threaded hole 423. Moreover, the sleeve 42 is provided with a sixth channel 424 in communication with the second chamber 422 and the fifth channel 332 of the rear lead shaft 3.

The spring member 43 is a disc spring disposed between the first stepped surface 411 of the propping member 41 and the second stepped surface 421 of the sleeve 42.

The screw member 44 is screwed into the first threaded hole 423 of the sleeve 42 and formed therein with a second threaded hole 441. A seal pad 442 is received in the second threaded hole 441 for closely abutting against the propping member 41. In addition, a fifth airtight ring 443 is partially embedded in the screw member 44.

The back cover 5 is screwed to the body 1 and centrally formed with a through hole 51.

Besides, the first channel 13 allows pressurized air coming from the gas cylinder 6 along a seventh channel 71 formed inside a grip 7 to enter the body 1. Thus, the overall intake stroke is short and the efficiency of pressure refill is improved. Meantime, since there is no external air duct connected to the pressure regulator 4, the paintball gun requires less assembling operation and fewer fixtures and parts, thus facilitating reduction of manufacturing costs, as compared with the prior art, thereby reducing the risk of parts coming off or getting loose. Additionally, a solenoid valve 8 is provided between the second channel 14 and the third channel 15 of the body 1 for regulating the pressure of air passing therethrough.

In an assembly process, referring to FIG. 1 again, the launching tunnel 2 and the rear lead shaft 3 are successively positioned in the first chamber 12 of the hollow barrel 11. At this time, the second airtight ring 32 mounted around the piston block 31 of the rear lead shaft 3 is fittingly wedged into the intake end 21 of the launching tunnel 2. Then the pressure regulator 4 abuts against the stepped surface on the stepped tunnel 33 of the rear lead shaft 3. At last, the back cover 5 is screwed to the body 1, thus finishing the assembly process.

Referring to FIG. 2, before percussion, the gas cylinder 6 communicates with the first channel 13 of the body 1 so as to allow pressurized air to be introduced into the body 1 through the seventh channel 71 inside the grip 7; meanwhile the pressurized air runs forward along the fifth channel 332 of the rear lead shaft 3 and the sixth channel 424 of the sleeve 42 on the regulator 4 to enter the second chamber 422. A negative pressure controlled by the solenoid valve 8 also reaches the first chamber 12 of the body 1 through the fourth channel 331 of the rear lead shaft 3. At this time, first chamber 12 acts as a room storing the pressurized air while the pressurized air continuously runs into the first chamber 12 through the first channel 13 until the room is fully filled.

Figure 3:
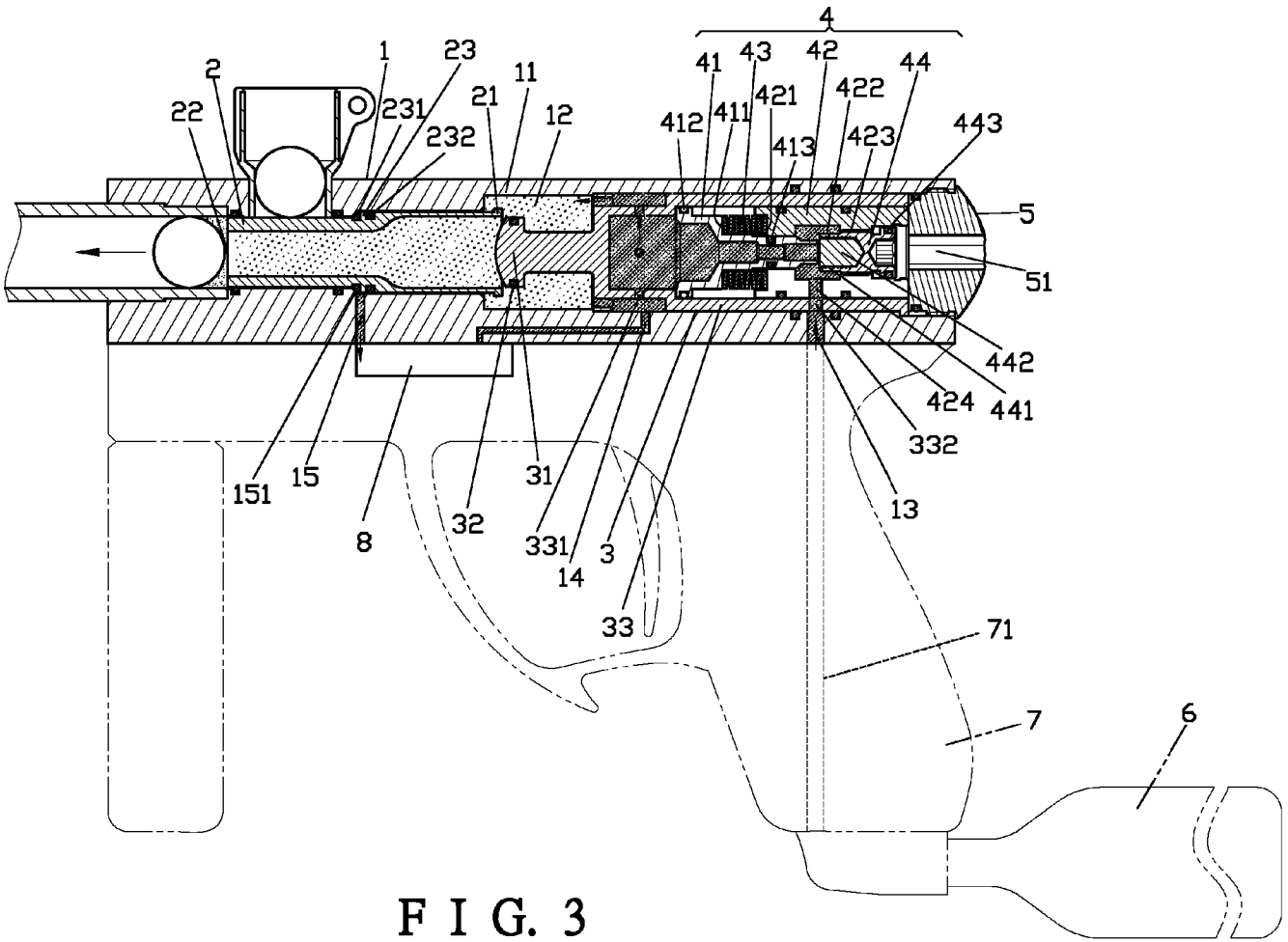
FIG. 3 illustrates the paintball gun in percussion of the present invention.
Figure 4:
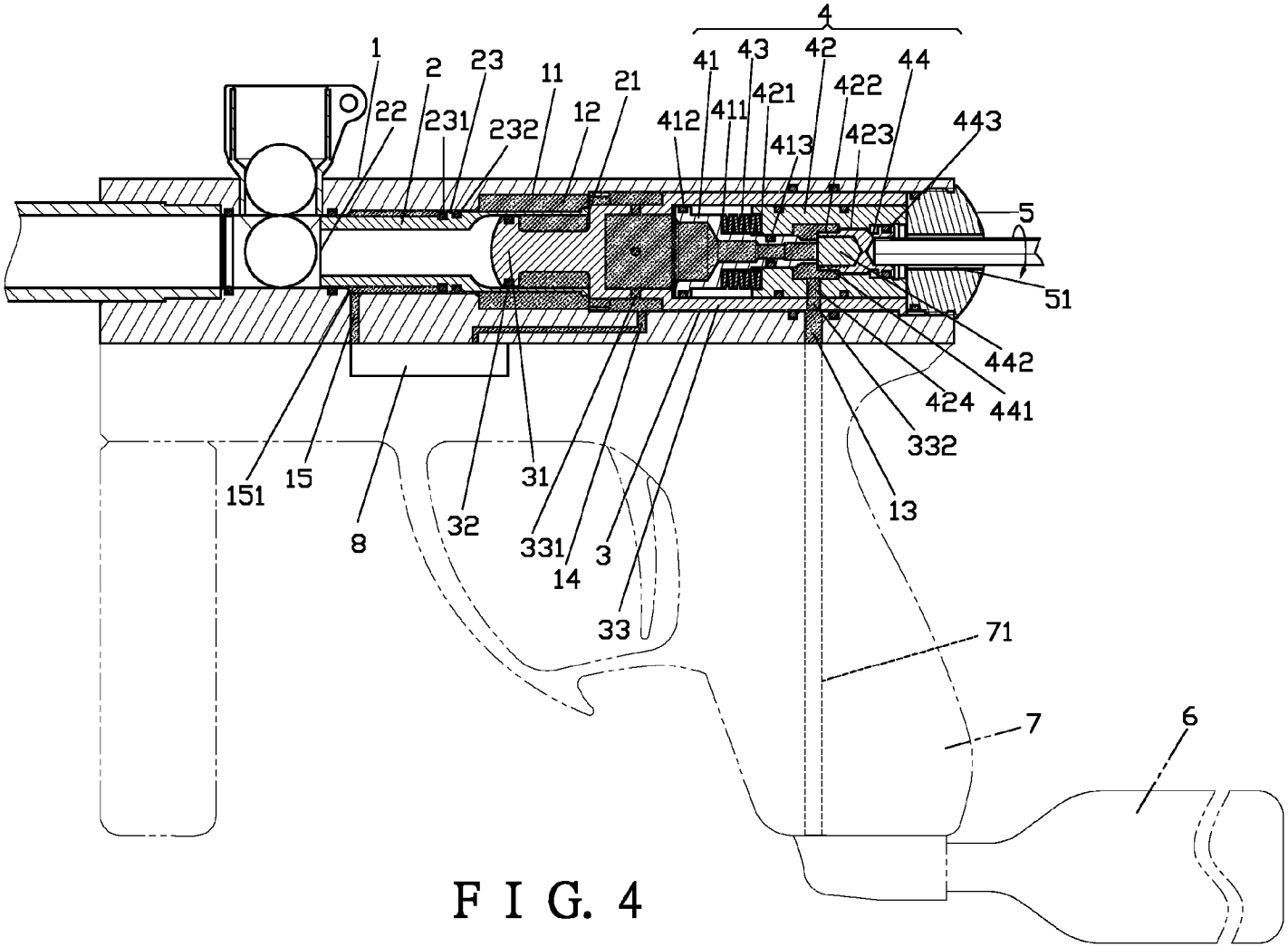
FIG. 4 shows a preferred embodiment of a pressure regulator of the paintball gun of the present invention.
Figure 5:
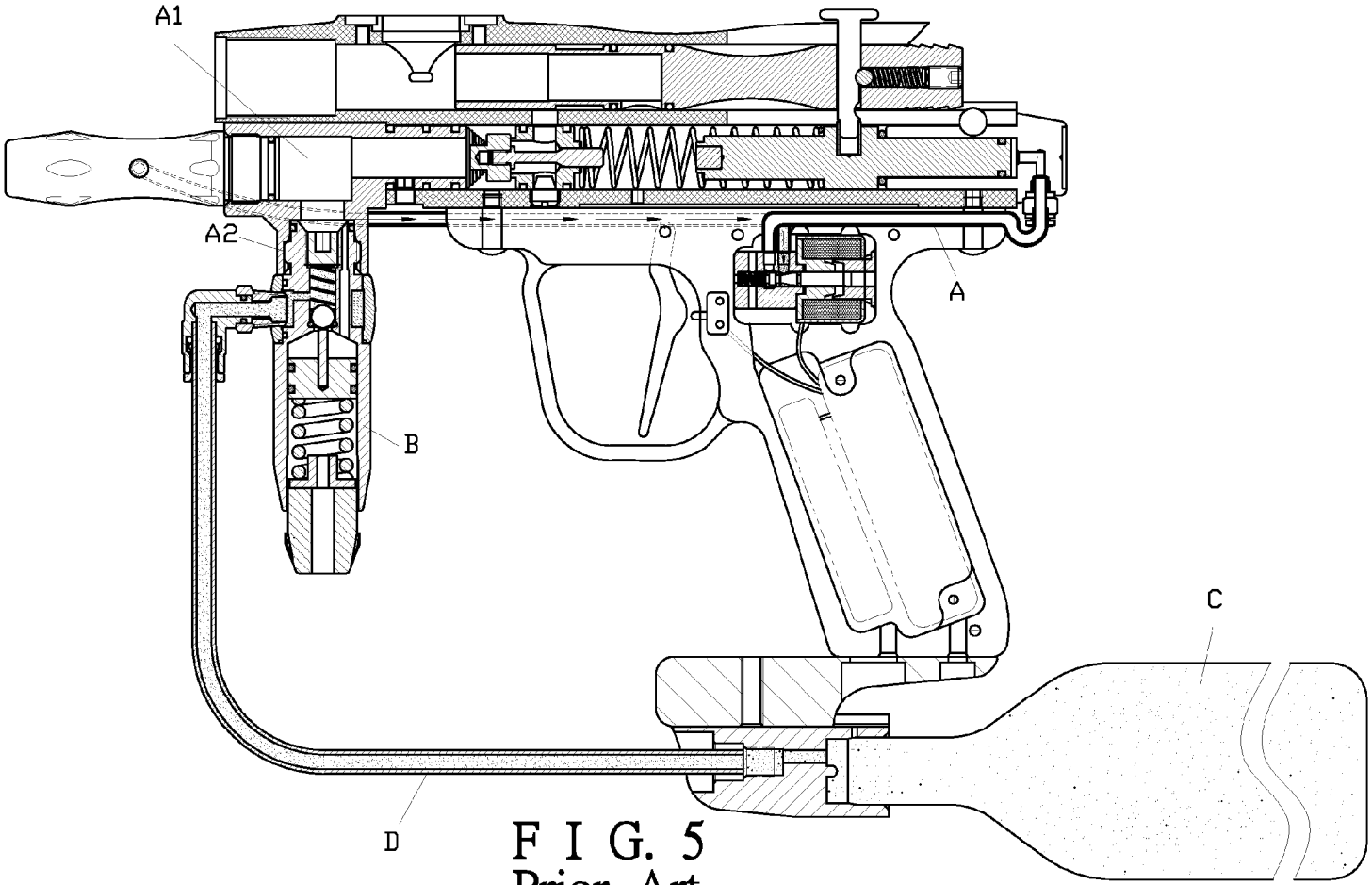
FIG. 5 Prior Art
FIG. 5 (PRIOR ART) depicts a conventional paintball gun.

In percussion, referring to FIG. 3, the pressurized air from the gas cylinder 6 enters the second chamber 422 of the sleeve 42 of the pressure regulator 4 and pushes the propping member 41 forward, so that the pressurized air arrives at the first chamber 12 of the body 1 through the fourth channel 331. Then the pressurized air in the first chamber 12 thrusts toward the intake end 21 of the launching tunnel 2, so as to make the retainer 23 slide toward the third channel 15 of the body 1. At this time, the intake end 21 of the launching tunnel 2 shifts together with the retainer 23 toward the second airtight ring 32 of the rear lead shaft 3. Meantime, the retainer 23 at the opposite end of the launching tunnel 2 moves forward along with the buffer ring 231 in front of the retainer 23, which allows exhaust to occur by way of the third channel 15. At last, the launching tunnel 2 disengages from the second airtight ring 32 so that a gap is formed between the rear lead shaft 3 and the intake end 21, allowing the pressurized air in the first chamber 12 to proceed toward the launching tunnel 2 through the intake end 21. Consequently, the pressurized air spurts at the outlet end 22 and shoots a paintball A out.

After percussion, infusion of pressurized air is started at the third channel 15 and the pressurized air is continuously supplied from the first channel 13, so that the retainer 23 moves away from the third channel 15 toward the second channel 14. As a result, the intake end 21 of the launching tunnel 2 returns to contact the piston block 31 of the rear lead shaft 3 and finally the second airtight ring 32 of the rear lead shaft 3 engages with the intake end 21 of the launching tunnel 2 again, thus the paintball gun getting prepared for the next percussion (as shown in FIG. 2).

To adjust the capacity of the regulator 4, a tool accessing the screw member 44 through the through hole 51 on the back cover 5 rotates the screw member 44 so that the sleeve 42 further compresses or relatively releases the spring member 43 accordingly, thereby changing the pressure of the incoming pressurized air.

What is claimed is:

1. A paintball gun having an internal pressure regulator, comprising:

a body, including:

a hollow barrel having a first chamber;

a first channel;

a second channel; and a third channel;

wherein the second channel and the third channel communicate with the first chamber, and a retaining flange is provided so as for the retaining flange to be adjacent to the third channel;

a launching tunnel shaped as a hollow tube and having:

one end defined as an intake end and an opposite end defined as an outlet end; and a retainer circumferentially provided inside the launching tunnel and provided with a buffer ring and a first airtight ring;

wherein the launching tunnel is such received in the hollow barrel that the retainer is positioned between the second channel and the third channel of the first chamber;

a rear lead shaft disposed in the first chamber of the hollow barrel, including a first end and an opposing second end, and having:

a piston block disposed at the first end and provided with a second airtight ring for being fittingly coupled with the intake end of the launching tunnel; and a stepped tunnel provided at the second end of the rear lead shaft and having a fourth channel and a fifth channel, allowing the fourth channel to correspond in position to and communicate with the second channel of the first chamber in the body and the fifth channel to correspond in position to and communicate with the first channel of the first chamber in the body;

the pressure regulator disposed in the stepped tunnel of the rear lead shaft to abut against a stepped surface of the stepped tunnel; and a back cover screwed to the body and centrally formed with a through hole.

2. The paintball gun of claim 1, wherein the pressure regulator comprises:

a propping member, tube-shaped and tapered, abutting against the stepped surface of the stepped tunnel of the rear lead shaft and having a first stepped surface located between a third airtight ring and a fourth airtight ring both mounted around the propping member;

a sleeve having:

a second stepped surface facing the first stepped surface of the propping member;

a second chamber formed centrally in the sleeve;

a first threaded hole; and a sixth channel in communication with the second chamber and the fifth channel of the rear lead shaft;

a spring member disposed between the first stepped surface of the propping member and the second stepped surface of the sleeve; and a screw member screwed into the first threaded hole of the sleeve and having:

a second threaded hole for receiving a seal pad for closely abutting against the propping member; and a fifth airtight ring partially embedded in the screw member.

3. The paintball gun of claim 2, wherein the spring member is a disc spring.

*4. A paintball gun, comprising:*

*a body comprising:*

*a hollow barrel comprising:*

*a first chamber;*

*a launching tunnel having an intake end and an outlet end, wherein the launching tunnel is in communication with the hollow barrel and in selective communication with the first chamber;*

*a rear shaft, including a first end and an opposing second end, and having a pressure regulator, wherein the first end of the rear shaft is distal from the outlet end of the launching tunnel, and*

*a grip comprising:*

*a first connector for connecting to a source of pressurized gas; and*

*an internal channel in communication with the first connector and the body to allow pressurized gas to flow from the source of pressurized gas to the pressure regulator.*

*5. The paintball gun of claim 4, the body further comprising:*

*a first opening in communication with a second chamber in the pressure regulator and the source of pressurized gas;*

*a second opening in selective communication with the first chamber and the second chamber;*

*a third opening in selective communication with the source of pressurized gas, wherein the first chamber is in communication with the launching tunnel during percussion, and wherein the third opening being in communication with the source of pressurized gas will cause the first chamber to not be in communication with the launching tunnel.*

*6. The paintball gun of claim 4 wherein the source of pressurized gas is a gas cylinder.*

*7. The paintball gun of claim 4 wherein the rear shaft comprises a stepped tunnel having a stepped surface and wherein the pressure regulator is disposed in the stepped tunnel.*

*8. The paintball gun of claim 7 wherein the pressure regulator abuts against the stepped surface of the stepped tunnel.*

*9. The paintball gun of claim 4 wherein the pressure regulator comprises a member configured to allow a user to adjust the capacity of the regulator.*

*10. The paintball gun of claim 9 wherein the member configured to allow a user to adjust the capacity of the regulator comprises a screw member.*

*11. The paintball gun of claim 9 wherein the body further comprises a back cover, wherein the back cover comprises a through hole for a user to adjust the capacity of the internal pressure regulator.*

*12. The paintball gun of claim 11 wherein the back cover is selectively removable.*

*13. A paintball gun, comprising:*

*a body comprising:*

*a rear shaft, including a first end and an opposing second end, and having a pressure regulator,*

*a launching tunnel having an intake end and an outlet end, wherein the launching tunnel is in selective communication with the pressure regulator, wherein the first end of the rear shaft is distal from the outlet end of the launching tunnel,*

*a first opening in communication with the pressure regulator and a source of pressurized gas,*

*a second opening in selective communication with the launching tunnel and the pressure regulator, and*

*a third opening in selective communication with the source of pressurized gas, wherein the pressure regulator is in communication with the launching tunnel during percussion, and wherein the third opening being in communication with the source of pressurized gas will cause pressure regulator to not be in communication with the launching tunnel; and*

*a grip comprising:*

*a first connector for connecting to the source of pressurized gas, and*

*an internal channel in communication with the first connector and the body to allow pressurized gas to flow from the source of pressurized gas to the pressure regulator.*

*14. The paintball gun of claim 13 wherein the source of pressurized gas is a gas cylinder.*

*15. The paintball gun of claim 13 wherein the rear shaft comprises a stepped tunnel having a stepped surface and wherein the pressure regulator is disposed in the stepped tunnel.*

*16. The paintball gun of claim 15 wherein the pressure regulator abuts against the stepped surface of the stepped tunnel.*

*17. The paintball gun of claim 13 wherein the pressure regulator comprises a member configured to allow a user to adjust the capacity of the regulator.*

*18. The paintball gun of claim 17 wherein the member configured to allow a user to adjust the capacity of the regulator comprises a screw member.*

*19. The paintball gun of claim 17 wherein the body further comprises a back cover, wherein the back cover comprises a through hole for a user to adjust the capacity of the internal pressure regulator.*

*20. The paintball gun of claim 19 wherein the back cover is selectively removable.*

* * * * *